US011311754B2

United States Patent
Bier (10) Patent No.: US 11,311,754 B2
(45) Date of Patent: Apr. 26, 2022

(54) AVALANCHE AIRBAG SYSTEM, CARRYING DEVICE, AND METHOD FOR OPERATING AN AVALANCHE AIRBAG SYSTEM

(71) Applicant: Ortovox Sportartikel GmbH, Taufkirchen (DE)

(72) Inventor: Christian Bier, Miesbach (DE)

( * ) Notice: Subject to any disclaimer, the term of this patent is extended or adjusted under 35 U.S.C. 154(b) by 11 days.

(21) Appl. No.: 16/964,992

(22) PCT Filed: Jan. 25, 2019

(86) PCT No.: PCT/EP2019/051902
§ 371 (c)(1),
(2) Date: Jul. 26, 2020

(87) PCT Pub. No.: WO2019/145505
PCT Pub. Date: Aug. 1, 2019

(65) Prior Publication Data
US 2021/0046337 A1 Feb. 18, 2021

(30) Foreign Application Priority Data
Jan. 26, 2018 (EP) ..................... 18153644

(51) Int. Cl.
*A45F 3/04* (2006.01)
*A62B 33/00* (2006.01)
(Continued)

(52) U.S. Cl.
CPC .............. *A62B 33/00* (2013.01); *A45F 3/04* (2013.01); *A63B 29/02* (2013.01); *H02J 7/0068* (2013.01);
(Continued)

(58) Field of Classification Search
CPC .. A41D 13/002; A41D 13/0025; A62B 33/00; A62B 29/021; A62B 99/00; B63C 9/08; A45F 2003/003
(Continued)

(56) References Cited

U.S. PATENT DOCUMENTS 5,932,992 A * 8/1999 Tomatsu ................. H02J 7/345
320/167
6,191,556 B1 * 2/2001 Galbraith ............. G01R 31/392
320/132
(Continued)

FOREIGN PATENT DOCUMENTS

EP 3202462 A1 8/2017

OTHER PUBLICATIONS

"Arc'teryx Voltair Avalanche Airbag Backpack" (Thegearcaster.com/2016/01/arcteryx-voltair-avalanche-airbag-backpack.html). (Year: 2016).*
(Continued)

*Primary Examiner* — Scott T McNurlen
(74) *Attorney, Agent, or Firm* — Bradley Arant Boult Cummings; Timothy L. Capria; Alexandra C. Lynn (57) ABSTRACT

The invention relates to an avalanche airbag system (10) comprising an airbag (14) and a filling device (20) for introducing ambient air into the airbag (14). The filling device (20) comprises a fan (16) with an electric motor (18), a first electric energy storage (22, 40) for providing electric energy to the electric motor (18), a second electric energy storage (24) and a control device (26) for actuating the electric motor (18). By means of the control device (26) depending on at least one parameter both a supplying of the electric motor (18) with electric energy originating from both energy storages (22, 40, 24) as well as with electric energy originating from only one of the two energy storages
(Continued)

(22, 40, 24) can be effected. Moreover, the invention relates to a backpack comprising such an avalanche airbag system (10) and a method for operating such an avalanche airbag system (10).

19 Claims, 3 Drawing Sheets

(51) Int. Cl.
| | |
|---|---|
| *A63B 29/02* | (2006.01) |
| *H02J 7/00* | (2006.01) |
| *H02K 11/00* | (2016.01) |
| *A45F 3/00* | (2006.01) |
| *H02J 7/34* | (2006.01) |

(52) U.S. Cl.
CPC .... *H02K 11/0094* (2013.01); *A45F 2003/003* (2013.01); *H02J 7/345* (2013.01)

(58) Field of Classification Search
USPC ............... 320/103, 110, 121, 138; 116/210; 441/80, 114; 2/DIG. 3
See application file for complete search history.

(56) References Cited

U.S. PATENT DOCUMENTS

| | | | | |
|---|---|---|---|---|
| 6,661,140 | B2* | 12/2003 | Agnes | H02K 1/185 |
| | | | | 310/179 |
| 7,696,728 | B2* | 4/2010 | Cross | H02J 7/342 |
| | | | | 320/166 |
| 8,777,684 | B2* | 7/2014 | Grutta | A62B 33/00 |
| | | | | 441/80 |
| 8,876,568 | B2* | 11/2014 | Blenkarn | B63C 9/081 |
| | | | | 441/80 |
| 2013/0149924 | A1 | 6/2013 | Grutta et al. | |
| 2014/0339902 | A1* | 11/2014 | Sepe, Jr. | H02M 3/158 |
| | | | | 307/80 |

OTHER PUBLICATIONS

"Float 30 avalanche airbag at −30 degrees C" (Youtube.com/watch?v=NNmXBph0toU). (Year: 2009).*
European Patent Office, International Search Report for International Application No. PCT/EP2019/051902, dated Feb. 26, 2019.
European Patent Office, Written Opinion of the International Searching Authority for International Application No. PCT/EP2019/051902, dated Feb. 26, 2019.

* cited by examiner

AVALANCHE AIRBAG SYSTEM, CARRYING DEVICE, AND METHOD FOR OPERATING AN AVALANCHE AIRBAG SYSTEM

The invention relates to an avalanche airbag system comprising an airbag and a filling device for introducing ambient air into the airbag. The filling device comprises a fan with an electric motor, a first electric energy storage for providing electric energy to the electric motor, a second electric energy storage, and a control device for actuating the electric motor. Moreover, the invention relates to a carrying device comprising such an avalanche airbag system and a method for operating such an avalanche airbag system.

Presently avalanche airbag systems are common, in which a cartridge filled with pressurized gas is used for filling or inflating the airbag. In case of a triggering of the avalanche airbag system effected by a user of the avalanche airbag system a closure of the cartridge is pierced through, and the contained gas flows into the airbag. In doing so via a Venturi device, through which the gas is flowing, additionally ambient air can be sucked in and be introduced together with the gas from the cartridge into the airbag.

As a disadvantage of such avalanche airbag systems is to be regarded the circumstance that multiple triggering is not possible. Moreover, air transportation regulations in some countries do not permit carrying filled cartridges. It cannot be ruled out either that in the future also for even more countries more restrictive transportation regulations with regard to the carrying of gas cartridges will be effective. This is because the gas in the cartridge of presently available avalanche airbag systems is pressurized at up to 300 bar.

As alternative avalanche airbag systems therefore for several years also ones with an electrically operated filling device are available. In these a very powerful fan with an electric motor makes sure that the airbag is filled with ambient air within the time of five seconds after triggering. Electricity is provided to the electric motor by an electric energy storage.

Common electric energy storages in the form of lithium-ion accumulators, however, at temperatures of less than −10 degrees Celsius suffer a significant loss in performance, and at temperatures of below −20 degrees Celsius a proper functioning of such electric energy storages is hardly given anymore.

Due to the high requirements made on the triggering safety of an avalanche airbag system, which must be guaranteed also at temperatures of up to −30 degrees Celsius, therefore energy storages configured as lithium-ion accumulators are dimensioned much larger than this would be required at moderate temperatures. This leads to it that the avalanche airbag system becomes very heavy, whilst remaining prone to problems at very low temperatures. Additionally, the provision of large lithium-ion accumulators is cost-intensive.

Document EP 3 202 462 A1 describes an avalanche airbag system comprising an electrically operated inflation device, wherein for supply of a fan of the inflation device capacitors in the form of supercapacitors or ultracapacitors are employed. In document EP 3 202 462 A1 it is indicated that such capacitors also under extreme temperature conditions within a range from −30 degrees Celsius to 50 degrees Celsius are not vulnerable with regard to the provision of electric energy for an electric motor of the fan. For recharging the capacitors the inflation device described in document EP 3 202 462 A1 can comprise a battery. The inflating of the airbag, however, is always and exclusively accomplished with the electric energy from the capacitors.

In this connection it is to be regarded as a disadvantage that capacitors show a comparatively fast self-discharge. If the avalanche airbag system of document EP 3 202 462 A1 thus is not being used during an extended period of time, ensuring the filling of the airbag with the electric energy remaining in the capacitors may become critical.

It therefore is the object of the present invention to improve an avalanche airbag system of the initially mentioned kind with regard to its triggering safety, to provide a carrying device with such an avalanche airbag system, and to provide a correspondingly improved method.

This object is solved by an avalanche airbag system having the features of claim 1, a carrying device having the features of claim 13, and a method having the features of claim 14. Advantageous embodiments with expedient further developments of the invention are indicated in the dependent claims.

The avalanche airbag system according to the invention comprises at least one airbag and a filling device for introducing ambient air into the airbag. The filling device comprises at least one fan with an electric motor, a first electric energy storage for providing electric energy to the electric motor, a second electric energy storage, and a control device. The control device is configured for actuating the electric motor. By means of the control device depending on at least one parameter both a supplying of the electric motor with energy originating from both energy storages as well as with energy originating from only one of the two energy storages can be effected. The control device consequently specifies whether depending on the at least one parameter the electric energy to be provided to the electric motor should be obtained from one of the energy storages or from both energy storages, when the control device actuates the electric motor.

By providing the at least two electric energy storages, which thus can be employed selectively alone or together for providing electric energy to the electric motor, a particularly high redundancy is provided. Thus the avalanche airbag system is improved also with regard to the triggering safety.

In particular, if both electric energy storages are used for providing electric energy to the electric motor, the joining-in of the second electric energy storage, which can be effected by the control device, allows for covering peak loads of the electric motor particularly well, occurring when filling the airbag with ambient air. The second electric energy storage thus can also be referred to as relief element.

Preferably, the control device is configured to effect, depending on a being switched-on of the electric motor, the supplying of the electric motor with electric energy originating from both energy storages. This is based on the finding that in particular immediately after the switching-on of the electric motor a very high power is to be provided by the energy storages. This is because at the very beginning of the filling process a correspondingly high power of the fan is required in order to move the airbag out from an envelope, which upon arrangement of the avalanche airbag system on a carrying device such as a backpack is also referred to as airbag pocket. For this purpose it makes sense if the electric motor obtains electric energy originating from both electric energy storages.

Moreover, when filling the airbag, it is to be ensured that the airbag is initially inflated at maximum power far enough for the airbag to exhibit a certain volume occupied by the ambient air. Here, too, the use of the electric energy of both energy storages for provision to the electric motor is advantageous. Moreover, at the very starting of the fan a particularly high power is to be provided by the electric motor.

And it can be particularly easily implemented in terms of control technology or closed-loop control technology that the control device always effects the supplying of the electric motor with electric energy originating from both energy storages each time the electric motor is switched on. Consequently the airbag or the avalanche airbag can be filled in an improved manner. The switching on of the electric motor can in particular be effected by actuating an actuation device or trigger device of the avalanche airbag system. Thus, for instance as a consequence of a pulling of a trigger handle the control device can receive a signal and subsequently switch on the electric motor.

Preferably, the control device additionally or alternatively is configured to effect, depending on an exceeding of a predetermined threshold value of a power to be output by the electric motor when filling the airbag, a supplying of electric energy originating from both energy storages. This means that the nominal output to be provided by the electric motor can be taken into consideration in the decision by the control device whether both energy storages should provide electric energy to the electric motor or only one energy storage. In this way peak loads occurring when filling the airbag can be covered particularly well. Moreover, it can thus be ensured that under all conditions the high power of the energy storages is available to the electric motor.

Preferably at least one of the two energy storages is configured as non-rechargeable battery. This is based on the finding that a battery that is not configured as accumulator is at low temperatures significantly more powerful than a rechargeable battery, i. e. an accumulator. Also by using the non-rechargeable battery for instance as first energy storage thus the triggering safety at low temperatures can be improved. Moreover after a triggering of the avalanche airbag non-rechargeable batteries can be easily and inexpensively replaced by new batteries. Moreover, a complex and delicate charging system for charging batteries that are configured as accumulators can be done without.

Preferably the first energy storage serves for providing electric energy to the control device and/or to further electronic components. This is in particular then advantageous if the first energy storage is configured as non-rechargeable battery or as accumulator. This is because the power to be provided for supply to the control device as well as to further electronics components, which are active in a standby mode of the filling device, is comparatively low and in particular many times lower than the energy to be applied for operating the electric motor of the fan. This means that if it is not necessary to cover peak loads but rather to keep the filling device in the standby mode, it is advantageous to resort to the first energy storage that is configured as non-rechargeable battery or accumulator. This is because this ensures an efficient operation of the avalanche airbag system. Moreover, then the electric energy of the second energy storage serving as relief element is sustained and is largely unrestrictedly available for covering peak loads. The further electronic components can comprise in particular light sources or such display elements, which indicate the standby mode of the filling device and/or a charging state of the electric energy storages.

It has further turned out to be advantageous if the first energy storage is configured for at least partially compensating a self-discharge of the second energy storage. This is because in this way it can be ensured that constantly favorable conditions for an optimized operation of the electric motor are given.

Preferably the second energy storage is configured as capacitor. In particular the second energy storage can be configured as supercapacitor or ultracapacitor and/or as lithium-ion capacitor. By means of the second energy storage that is configured as capacitor peak loads occurring during operation of the electric motor can be covered particularly well. This is because the capacitor can deliver its electric energy particularly fast. This is due to the power density in particular of a supercapacitor that is many times larger in comparison with an accumulator. Moreover the second energy storage configured as capacitor has the advantage that the capacitor also at very low and very high temperatures can easily provide its electric energy to the electric motor.

Preferably the control device is configured to effect a charging of the capacitor with energy originating from the first energy storage. Then it is not necessary to provide a separate charging device for the capacitor.

It is therefore particularly preferred if the first energy storage is configured as non-rechargeable battery and the second energy storage as capacitor, wherein the control device ensures that by means of the non-rechargeable battery the self-discharge of the capacitor can be compensated for. In this way it can namely be ensured, on the one hand, that the capacitor at any time is capable to cover peak loads to be provided by the electric motor. Nevertheless the filling device is of a particularly simple design and a reliable triggering of the airbag can be made sure.

Additionally or alternatively it may be envisaged that the control device is configured for effecting an introduction of electric energy from the capacitor into the first energy storage. Thus for instance when the airbag has not been triggered, electric energy from the capacitor can be shifted back into the first energy storage. Thereby the losses involved in the self-discharge of the capacitor are particularly largely avoided.

Preferably the control device is configured for charging the capacitor with electric energy originating from the first energy storage, depending on a temperature. For instance it may be envisaged that the capacitor is then charged when the avalanche airbag system is exposed to very cold ambient temperatures. This is based on the finding that by means of the first energy storage that is preferably configured as battery or accumulator electric energy for supply to the electric motor can be provided easily and reliably as long as temperatures are not too low.

This may for instance be the case at the beginning of a ski tour if a ski tourer who is equipped with the avalanche airbag system starts out from a heated place such as a hut or accommodation of this kind. At decreasing ambient temperature and thus the first energy storage cooling down, however, it may then make sense to charge the capacitor. This is because the capacitor is very insensitive to low temperatures with regard to the delivery of the electric energy stored therein to the electric motor. In this way the low power of the first energy storage at extremely low temperatures can be accommodated. For this purpose it may in particular be envisaged that the control device then effects the charging of the capacitor with electric energy originating from the first energy storage if the ambient temperature drops below a predetermined threshold value.

Additionally or alternatively, the control device can be configured to effect, depending on an activating of a standby mode of the filling device, the charging of the capacitor with electric energy originating from the first energy storage. This means that if the filling device is brought into the standby mode or on-call service mode, the control device ensures that the capacitor is then charged. Thereby the time is minimized, during which by self-discharge of the capacitor the quantity of electric energy stored therein can decrease. This, too, is advantageous with regard to the triggering safety of the avalanche airbag system. Moreover, also such configuration of the control device is particularly easy to implement in terms of control technology or closed-loop control technology.

Preferably the capacitor is arranged on a printed circuit board and fixed in its position by means of a potting compound. In particular the capacitor can be provided by a plurality of capacitor elements, which are electrically connected in series. By the involved design for a higher voltage the capacitor can provide a particularly large amount of electric energy.

The control device can comprise a monitoring system and/or management system, by means of which defective states of the energy storage can be detected, and which can in particular be configured to protect the energy storage against overcharging and/or to perform a charge balance between energy storage units of the respective energy storage. This is for instance advantageous with regard to the capacitor elements of the capacitor, which are electrically connected in series.

By potting the capacitor with further capacitors on the printed circuit board it can be ensured that the capacitor is sufficiently vibration-proof and corrosion-proof and thus resists well the strains occurring during use of the avalanche airbag system.

Additionally, for achieving a high vibration resistance vibration-resistant plug connectors, a robust mechanical setup, a fixation of critical components, in particular by cast housing and or a potting of these components and the like can be employed. For the vibration resistance it is moreover advantageous if the capacitor elements are accommodated to lie in a flat housing. In this way it can be ensured that a height of the housing is for instance at approximately 45 millimeters. Also the printed circuit board can be potted and/or painted in order to raise the vibration-resistance of sensitive components of the filling device.

A static charging of components of the avalanche airbag system or the filling device, as it is for instance to be feared to occur in the case of a transportation of the avalanche airbag system in a helicopter due to the rotation of the rotor blades of the helicopter, can be avoided by connecting components such as the electric motor, the control device or such electronic components, as well as keys, switches, and the like with each other on the same ground potential.

Preferably the avalanche airbag system comprises an alarm device that can be actuated by means of the control device and is configured to request a user of the avalanche airbag system after a certain period of time has elapsed to recharge at least one of the energy storages and/or to replace at least one of the energy storages. For instance then, if the second energy storage is configured as capacitor, after 24 hours the alarm device can request the user to recharge the capacitor. This, too, increases the triggering safety of the avalanche airbag system.

In particular if as the first energy storage a non-rechargeable battery is used, by means of the alarm device the user can be requested to exchange the battery, for instance after a triggering of the airbag or after an extended storage period of the avalanche airbag system. The alarm device can also request the user to recharge the first energy storage if same is configured as accumulator.

Preferably at least one of the energy storages has at least two separate energy storage units that can be removed from the avalanche airbag system. In this connection a respective nominal capacity of the energy storage unit is designed such that by using the electric energy of the respective energy storage unit the airbag, in particular at an ambient temperature of up to −30 degrees Celsius, can be filled at least once. Thus a particularly high failure safety is provided, and yet a user of the avalanche airbag system can decide whether he equips the avalanche airbag system with only one energy storage unit or with more than one of the energy storage units in order to facilitate a second triggering if need be. Thereby the flexibility in using the avalanche airbag system is raised.

Preferably the avalanche airbag system comprises an actuation device, by means of which the filling device can be brought into a triggered state, in which the filling device introduces ambient air into the airbag. The actuation device can comprise a handle, which the user of the avalanche airbag system pulls in order to achieve the filling or the inflating of the airbag. In particular a switching device can be switched by means of the actuation device, wherein the control device receives a signal indicating that the switch device has been switched. Thereupon the control device by actuating the electric motor effects that the airbag is inflated.

In particular on the actuation device, for instance on the handle, moreover an indicator can be configured, which provides information about the charging state of the energy storages and/or about an operating state of the filling device. For instance the indicator can indicate that the filling device is in the on-call service mode or standby mode.

The carrying device according to the invention, which can be configured for instance as carrying harness, in particular, however, as backpack, comprises an avalanche airbag system according to the invention. In this connection preferably the airbag or avalanche airbag is accommodated in an airbag pocket of the backpack. The airbag pocket is in the majority of cases a compartment or a container of this kind, which is separate from a further stowage compartment of the backpack and in which the airbag is stored to be protected against damage. Moreover the airbag pocket ensures that the airbag during standard use does not drop out from the backpack. At the same time the airbag should be packed as compactly as possible so as to avoid that unnecessarily precious backpack volume is taken up by the airbag. This purpose, too, is ensured by the airbag pocket or the container, in which the airbag brought into its stowage position is received. If, however, the avalanche airbag system is triggered, as a consequence of the inflating of the airbag the opening of the airbag pocket is effected so that the then released airbag can be filled further.

The method according to the invention for operating an avalanche airbag system comprising at least one airbag and a filling device, involves introducing ambient air into the airbag by means of the filling device. The filling device comprises at least one fan with an electric motor, a first electric energy storage for providing electric energy to the electric motor, a second electric energy storage, and a control device, which actuates the electric motor. By means of the control device depending on at least one parameter it is specified whether the electric motor when being actuated is supplied with electric energy originating from both energy storages or with electric energy originating from only one of the two energy storages. By such a method the triggering safety of the avalanche airbag system is improved.

The advantages and preferred embodiments of the avalanche airbag system according to the invention also apply to the carrying device according to the invention and to the method according to the invention and vice versa.

The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Thus, implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the back-references of the claims.

Further advantages, features, and details of the invention may be gathered from the claims, the following description of preferred embodiments as well as the drawings. These show in:

Figure 1:
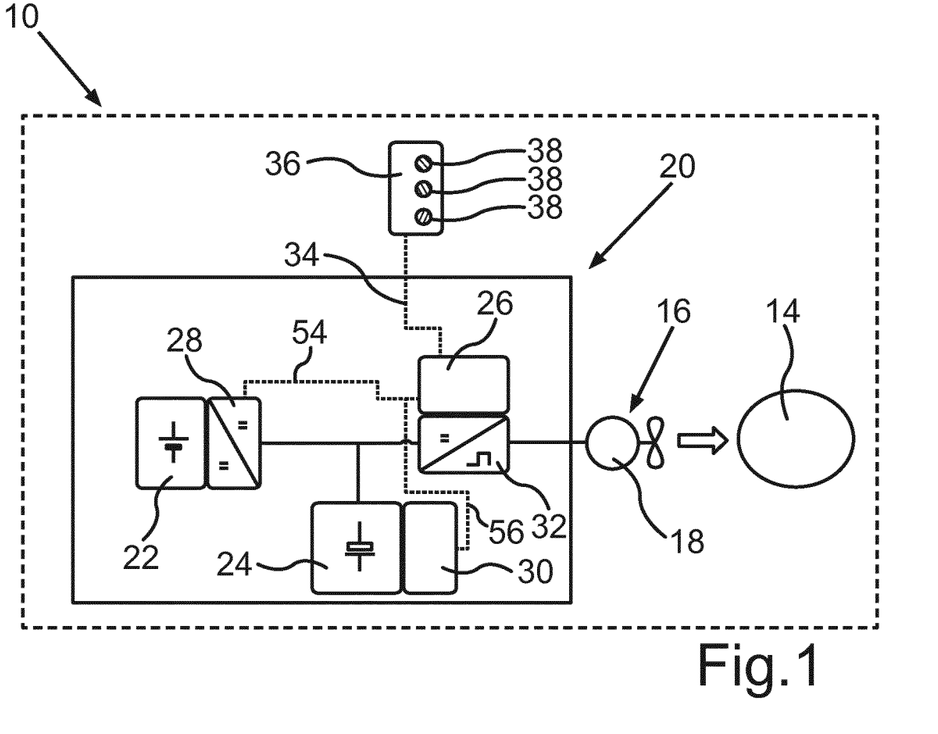
FIG. 1 schematically an avalanche airbag system, in which for supplying an electric motor of a fan a battery and a capacitor are employed, wherein by means of the fan an airbag or avalanche airbag is inflated.
Figure 6:
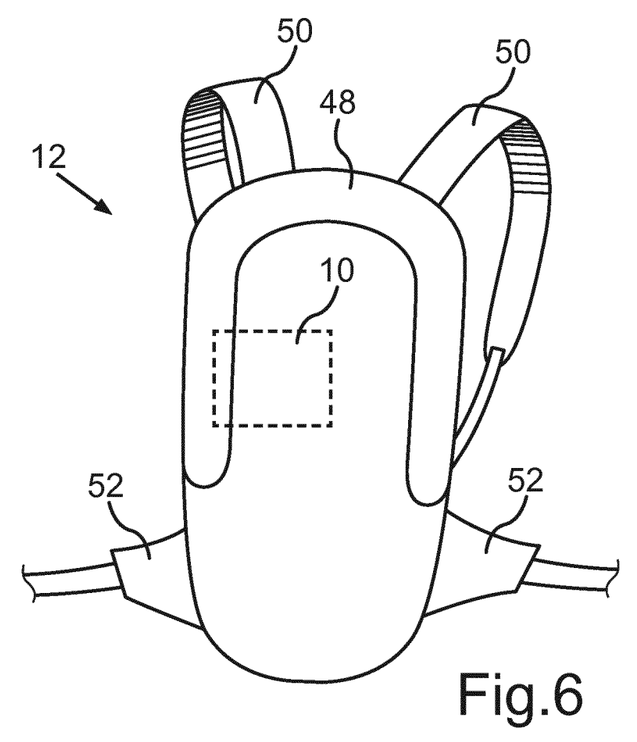
FIG. 6 schematically an avalanche airbag backpack comprising the avalanche airbag system according to FIG. 1.

FIG. 1 schematically shows an avalanche airbag system 10, as it is envisaged for use in a carrying device for instance in the form of a backpack 12 (see FIG. 6). If the avalanche airbag system 10 is arranged in the backpack 12, the backpack 12 is an avalanche airbag backpack. A filling device 20 of the avalanche airbag system 10 in the present case is configured to fill an airbag 14 of the avalanche airbag system 10 with ambient air by operating a fan 16, wherein the fan 16 comprises an electric motor 18. Consequently, by operating the fan 16 after a triggering of the avalanche airbag system 10 it is ensured that the airbag 14 is filled with ambient air within about five seconds.

In particular at very low ambient temperatures, at which the avalanche airbag 10 can be used, it is a challenge to ensure the provision of electric energy to the electric motor 18. In the present case therefore according to FIG. 1 the filling device 20 of the avalanche airbag system 10 comprises not only the fan 16 but also a first energy storage in the form of a battery 22 and a second energy storage in the form of a capacitor 24. The capacitor 24 can in particular be configured as supercapacitor or ultracapacitor in particular in the form of a double layer capacitor and/or as lithium-ion capacitor. Moreover, the capacitor 24 can comprise a plurality of capacitor elements in the form of supercapacitors or ultracapacitors or lithium-ion capacitor units preferably connected in series. Then the capacitor 24 can provide a higher voltage than a single capacitor element is capable to provide.

A control device for instance in the form of an electronic control device 26 actuates the electric motor 18 and in doing so specifies from which of the energy storages that can be employed independently of each other for providing electric energy to the electric motor 18 electric energy should be provided to the electric motor 18 after a triggering of the avalanche airbag system 10. In particular the control device 26 can ensure that both electric energy from the battery 22 as well as electric energy from the capacitor 24 is provided to the electric motor 18 in order to effect the inflating or the filling of the airbag 14 with ambient air.

The battery 22 can in particular be formed by at least two common, non-rechargeable battery cells (see FIG. 4), which can be electrically conductively connected with each other. In particular exactly two such battery cells can be envisaged for providing the battery 22. By means of a DC-DC converter 28 the voltage provided by the battery 22 can be adjusted to the voltage provided by the capacitor 24.

As has already been set out, in analogy to the battery 22 also the capacitor 24 can be formed by a plurality of capacitor elements or cells, which are preferably in the same way as the battery cells electrically connected in series. By means of a monitoring unit 30 assigned to the capacitor 24 differences in voltage between such capacitor units or capacitor elements can be identified and balanced. The control device 26 is configured for actuating the DC-DC converter 28 and the monitoring unit 30. Corresponding control lines 54, 56 are shown in FIG. 1. Moreover the control device 26 actuates a further converter 32, which for instance can be configured as inverter, and via which the electric energy originating from the battery 22 and the capacitor 24 can be supplied to the electric motor 18.

Via a triggering line 34 the control device 26 is connected with a triggering handle 36 or such an actuation device. For instance by pulling the triggering handle 36 the filling device 20 can be brought into a triggered state, in which the filling device 20 introduces ambient air into the airbag 14. On the triggering handle 36 display elements 38 can be arranged, which provide information about the charging state of the energy storage in the form of the battery 22 and the capacitor 24. For instance a light-emitting diode illuminating in green, one illuminating in yellow, and one illuminating in red can be provided as such display elements 38. Moreover, the display elements 38 can preferably indicate that the filling device 20 is switched on and is in an on-call service mode or standby mode.

By using non-rechargeable battery cells for providing the battery 22 the provision of energy also at very low temperatures is clearly more efficient than this would be case when using accumulators as the first energy storage. Moreover after the triggering of the airbag 14 the battery cells of the battery 22 can be replaced very easily by new battery cells. In order to further increase safety with regard to the inflating of the airbag 14, in the present case the capacitor 24 is provided, which serves as relief element.

By such a relief element peak loads in the operation of the electric motor 18 can be covered. Moreover the capacitor 24 is not temperature-sensitive so that by means of the capacitor 24 also at very low temperatures a lot of electric energy for operating the electric motor 18 can be made available very fast.

In particular it is envisaged that electric energy is provided to the control device 26 by means of the battery 22. When operating the electric motor 18, by contrast, the capacitor 24 supports the battery 22. Preferably the battery 22, however, is designed such that at least a single triggering, i. e. at least a single filling of the airbag 14, with the amount of energy stored in the battery 22 is also possible at ambient temperatures of up to −30 degrees Celsius.

The control device 26 can also ensure that the electric motor 18 is operated merely with the energy originating from the capacitor 24. In particular, however, it is envisaged that both the battery 22 as well as the capacitor 24 at least temporarily provide electric energy for operating the electric motor 18. This can then be effected by the control device 26 for instance if the electric motor 18 is switched on or if the electric motor 18 is to provide a certain nominal output, which is higher than a predetermined threshold value of the nominal output.

Figure 2:
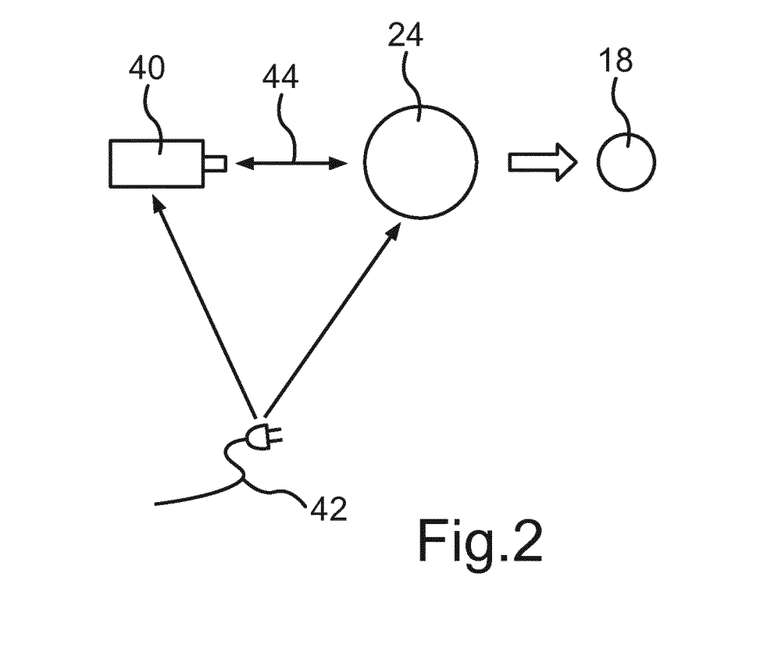
FIG. 2 a variant of the avalanche airbag system, in which instead of the battery an accumulator is employed.

FIG. 2 schematically shows components of a variant of the avalanche airbag system 10. In this variant the first electric energy storage is not configured as non-rechargeable battery 22 but as rechargeable battery or as accumulator 40. In FIG. 2 a charging cable 42 is schematically shown, which can be connected to an external power grid in order to charge the capacitor 24 via the grid for instance before a ski tour. Moreover, by means of the charging cable 42 also the accumulator 40 can be charged. On the side of the filling device 20 for connecting the charging cable 42 a suitable charging connection, for instance in the form of a USB connection, in particular a mini USB connection, is provided. Moreover, in FIG. 2 by a double arrow 44 it is indicated that the accumulator 40 can be employed for compensating for a self-discharge of the capacitor 24.

This compensating for the self-discharge of the capacitor 24 by the way is also possible with the battery 22 shown in FIG. 1. If the battery 22 is formed by two common, non-rechargeable battery cells, it can be ensured that by means of the electric energy of the battery 22 the capacitor 24 can be completely charged four to five times. This is the case in particular if the shifting of electric energy from the battery 22 into the capacitor 24 takes place at temperatures of more than zero degree Celsius. If the capacitor 24 can be completely charged four to five times, by means of the electric energy shifted into the capacitor 24 four to five triggerings of the avalanche airbag system 10 are possible, upon which the airbag 14 is inflated.

Also in the variant shown in FIG. 2 both the accumulator 40 as well as the capacitor 24 can provide electric energy to the electric motor 18 independently of each other. The control device 26, however, can also in this variant effect the supplying of the electric motor 18 with electric energy originating both from the accumulator 40 as well as from the capacitor 24.

In analogy to the variant described with reference to FIG. 2 also in the variant of the avalanche airbag system shown in FIG. 3 not the capacitor 24 but the first energy storage in the form of the battery 22 ensures the provision of electric energy to the control device 26 or further electronic components of the filling device 20. Moreover also in the variant shown in FIG. 3 it is envisaged that the battery 22 compensates for a self-discharge of the capacitor 24 serving as relief element. However, in the case of the configuration of the first energy storage as the battery 22 no electric energy can be introduced from the capacitor 24 into the battery 22. In the variant shown in FIG. 2, however, this is possible. Therefore in FIG. 3 merely an arrow 46 is shown, which illustrates the compensating for the self-discharge of the capacitor 24. In order to facilitate the shifting back of electric energy from the capacitor 24 into the accumulator 40, as illustrated by the double arrow 44, the DC-DC converter 28 (not shown in FIG. 2) (see FIG. 1) is preferably configured as bidirectional DC-DC converter 28.

Figure 3:
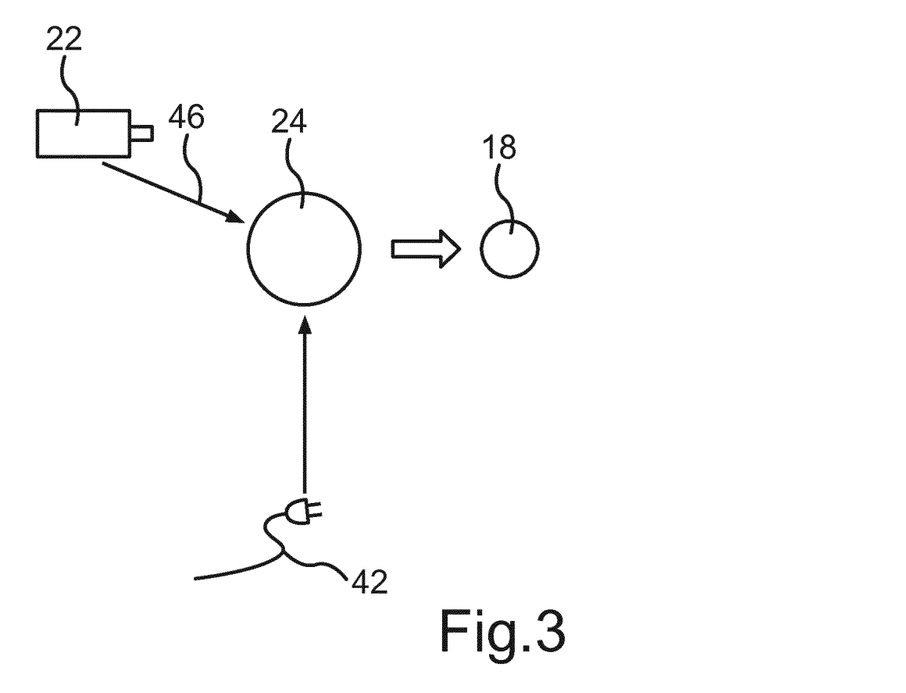
FIG. 3 schematically options to charge the capacitor of the avalanche airbag system according to FIG. 1 by connecting to a power grid or by means of the battery.

Moreover, it also derives from FIG. 3 that the capacitor 24 can be charged via the external power grid by connecting the capacitor 24 to the charging cable 42.

Figure 4:
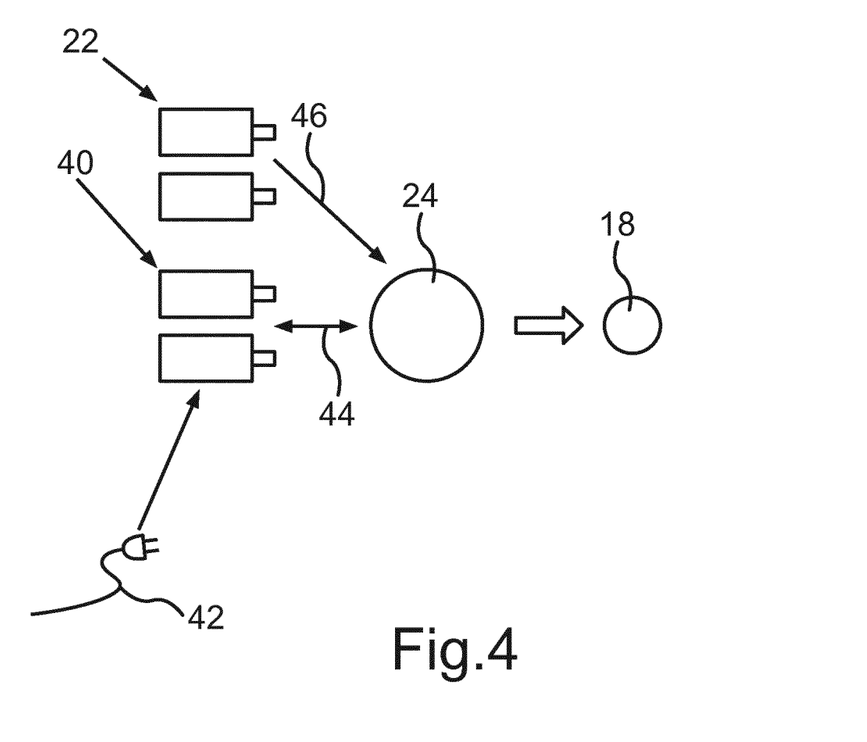
FIG. 4 a further variant of the avalanche airbag system, in which a charging of the capacitor via an external power grid is not envisaged, however, the capacitor is recharged by a battery or an accumulator.

In the variant of the avalanche airbag system 10 shown in FIG. 4 both the battery 22 as well as the accumulator 40 are provided. The battery 22 and the accumulator 40 thus form a first energy storage of the filling device 20 (see FIG. 1). Both the battery 22 as well as the accumulator 40 can be used for compensating for the self-discharge of the capacitor 24, as this is illustrated in FIG. 4 by the arrow 46 or the double arrow 44. However, in the variant according to FIG. 4 it is not envisaged that the capacitor 24 is recharged via the external power grid, i. e. by using the charging cable 42. Rather, merely the battery 22 or the accumulator 40 ensure charging of the capacitor 24. In this way no separate charging device for the capacitor 24 needs to be provided and kept available.

In the case of the variants of the avalanche airbag system 10 described with reference to FIG. 1 to FIG. 4 the charging of the capacitor 24 can be effected by means of the control device 26, if the filling device 20 is brought into the standby mode. For this purpose the avalanche airbag system 10 is switched on and electric energy is provided to the control device 26. In this standby mode the actuation of the triggering handle 36 effects that the fan 16 fills the airbag 14 with ambient air. In doing so the control device 26 receives a signal indicating that the triggering handle 36 was actuated, and consequently the control device 26 actuates the electric motor 18.

Upon switching on or activating the standby mode the fan 16 can be briefly operated so that the user of the backpack 12 or the avalanche airbag system 10 receives a feedback to the effect that the standby mode is activated. However, there are also other ways in which an, in particular haptic feedback for this purpose can be generated, or it can be optically or acoustically communicated to the user that the standby mode of the filling device 20 has been activated.

It may be envisaged that the capacitor 24 is always charged each time the filling device is brought into the standby mode. In this way losses of the capacitor 24 due to the self-discharge are kept particularly low. Moreover, it may be envisaged that, if the ambient temperature drops to below a predetermined threshold value, electric energy from the battery 22 or from the accumulator 40 is shifted into the capacitor 24. In this way the power of the accumulator 40 or battery 22 decreasing at low ambient temperature can be accommodated.

The filling device 20 can also comprise at least two separate units in the form of batteries 22 and/or accumulators 40. In this connection preferably one of these units in each case is sufficient to effect the filling of the airbag 14 with ambient air upon at least one triggering of the avalanche airbag system 10. In such case the user of the avalanche airbag system 10 can decide himself whether the second battery 22 or the second accumulator 40 is carried along in order to facilitate a second triggering if need be. Also in the case of such a constellation additionally the relief element in the form of the capacitor 24 can be provided in order to store therein part of the electric energy and to raise the triggering safety of the avalanche airbag system 10 at low temperatures. An example of such an avalanche airbag system 10 is schematically shown in FIG. 4.

Figure 5:
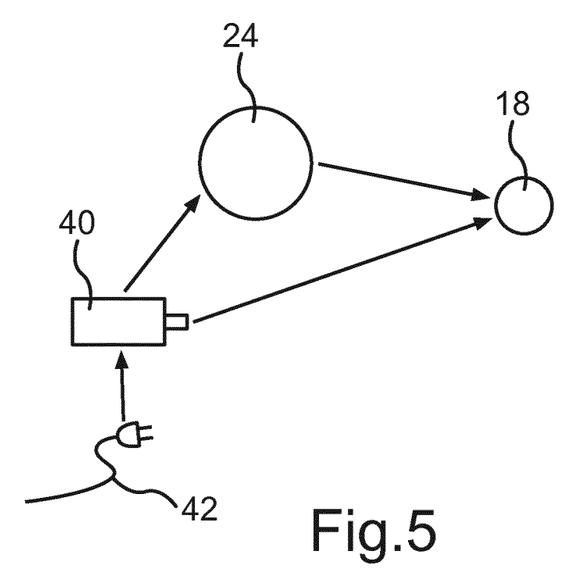
FIG. 5 a further variant of the avalanche airbag system, in which equally the battery can be used for charging the capacitor, wherein both the capacitor as well as the battery can provide electric energy to the electric motor.

In FIG. 5 components of the avalanche airbag system 10 according to a further variant are shown, from which it becomes clear that by both the accumulator 40 as well as by the capacitor 24 electric energy for the electric motor 18 can be made available. Also in the variant shown in FIG. 5 it is however envisaged that the capacitor 24 is not recharged by connecting to an external power source. Rather the charging of the capacitor 24 is effected by the accumulator 40. However, the accumulator 40, as schematically shown in FIG. 5, in turn can be charged via the charging cable 42 by connecting the charging cable 42 to the external power grid.

When inflating the airbag 14, the electric motor 18 of the fan 16 can initially be operated at maximum power, in order to fill the airbag 14 with a certain volume of ambient air of for instance about 150 liters. In a further step then the pressure to be set in the interior of the airbag 14 can be built up, wherein for sustaining the pressure in particular a valve can be closed. For building up the pressure the electric motor 18 can be operated at a lower power than for inflating the desired volume. Moreover, it may be envisaged that for beginning the inflation operation the electric motor 18 is at least predominantly provided with electric energy from the capacitor 24. However, also at the beginning of the inflation operation additionally the electric energy of the battery 22 or the accumulator 40 can be used.

In FIG. 6 it is schematically shown that the airbag 14 of the avalanche airbag system 10 can be arranged in an airbag pocket 48 of the backpack 12. Such an airbag pocket 48 in the present case is a compartment or a container of this kind, which is separate from a further stowage compartment of the backpack 12 and in which the airbag 14 is stored to be protected against damage. Moreover, the airbag pocket 48 ensures that the airbag 14 during standard use does not drop out from the backpack 12. At the same time the airbag 14 should be packed as compactly as possible to avoid unnecessarily precious backpack volume to be taken up by the airbag 14. Also this purpose is fulfilled by the airbag pocket 48. If the avalanche airbag system 10 is triggered, this effects the opening of the airbag pocket 48 as a consequence of the inflating of the airbag 14. Then the released or exposed airbag 14 can subsequently be filled further with ambient air by means of the fan 16.

Of the backpack 12 in FIG. 6 moreover shoulder straps 50 as well as waist straps 52 are schematically shown. The trigger handle 36 of the avalanche airbag system 10, which in particular can protrude from one of the shoulder straps 50, is not shown in FIG. 6 for the sake of clarity.

What is claimed is:

1. An avalanche airbag system, comprising:
   at least one airbag; and
   a filling device for introducing ambient air into the airbag, the filling device including
      at least one fan with an electric motor,
      a first electric energy storage for providing electric energy to the electric motor,
      a second electric energy storage, and
      a control device for actuating the electric motor,
   wherein the control device, depending on at least one parameter, is configured to selectively supply the electric motor with:
      electric energy originating from the first and second electric energy storages,
      electric energy originating from only the first electric energy storage, or
      electric energy originating from only the second electric energy storage.

2. The avalanche airbag system according to claim 1, wherein the control device is configured to control, depending on a powered on state of the electric motor, the supplying of the electric motor with electric energy originating from the first and second electric storages.

3. The avalanche airbag system according to claim 1, wherein the control device is configured to cause, depending on an exceeding of a predetermined threshold value of a power to be output by the electric motor when introducing air into the airbag, the supplying of the electric motor with electric energy originating from the first and second electric energy storages.

4. The avalanche airbag system according to claim 1, wherein at least one of the first or second electric energy storages comprises at least one non-rechargeable battery.

5. The avalanche airbag system according to claim 1, wherein the first electric energy storage is configured to provide electric energy to one or more of: the control device, one or more further electronic components, or the second electric energy storage for at least partially compensating for a self-discharge of the second electric energy storage.

6. The avalanche airbag system according to claim 1, wherein the second electric energy storage comprises at least one capacitor.

7. The avalanche airbag system according to claim 6, wherein the control device is configured to cause a charging of the at least one capacitor with electric energy originating from the first electric energy storage.

8. The avalanche airbag system according to claim 7, wherein the control device is configured to cause the charging of the at least one capacitor with the electric energy originating from the first electric energy storage depending on at least one of a temperature or an activating of a standby mode of the filling device.

9. The avalanche airbag system according to claim 6, wherein the at least one capacitor is arranged on a printed circuit board and is fixed in a position on the printed circuit board by a potting compound.

10. The avalanche airbag system according to claim 6, wherein the control device is configured to cause an introducing of electric energy from the capacitor into the first electric energy storage.

11. The avalanche airbag system according to claim 1, further comprising an alarm device, which is configured to be actuated by the control device after a predetermined period of time has elapsed, to signal the need to recharge at least one of the first and second electric energy storages or to recharge at least one of the first and second electric energy storages and replace at least one of the first and second electric energy storages.

12. The avalanche airbag system according to claim 1, wherein at least one of the electric energy storages comprises at least two separate energy storage units, wherein the two separate energy storage units are removable from the avalanche airbag system, and wherein the respective nominal capacity of the energy storage units are configured such that by using the electric energy of the respective energy storage unit the airbag can be filled at least once via the electric motor of the filling device.

13. The avalanche airbag system according to claim 12, wherein the respective nominal capacity of the at least two separate energy storage units are configured such that by using the electric energy of the one of the at least two separate energy storage units, the airbag can be filled at least once via the electric motor of the filling device when the ambient temperature is −30 degrees Celsius or lower.

14. The avalanche airbag system according to claim 1, further comprising an actuator for triggering the filling device into a triggered state, wherein when the filling device is in a triggered state, the filling device introduces ambient air into the airbag.

15. A carrying device comprising the avalanche airbag system according to claim 1.

16. The carrying device of claim 15, wherein the carrying device comprises a backpack.

17. The avalanche airbag system according to claim 1, wherein the second electric energy storage comprises at least one supercapacitor.

18. A method of operating an avalanche airbag system, the method comprising:
   providing an avalanche airbag system, the avalanche airbag system including
      at least one airbag, and
      a filling device configured to introduce air into the airbag, wherein the filling device comprises
         at least one fan with an electric motor,
         a first electric energy storage for providing electric energy to the electric motor,
         a second electric energy storage, and
         a control device for actuating the electric motor; and
   depending on at least one parameter, actuating the electric motor via the control device so that upon actuation, the electric motor is supplied with:
      electric energy originating from the first and second electric energy storages,
      electric energy originating from only the first electric energy storage, or
      electric energy originating from only the second electric energy storage.

19. The method of operating an avalanche airbag system according to claim 18, further comprising filling the airbag at least once via the electric motor of the filling device with ambient air when the ambient temperature is −30 degrees Celsius or lower.

* * * * *